Nov. 8, 1960     A. O. SCHAEFER     2,958,913
PRODUCTION OF LARGE MASSES OF STEEL SUITABLE
FOR THE PRODUCTION OF FORGINGS, AND
APPARATUS THEREFOR
Filed Jan. 20, 1959

INVENTOR
Adolph O. Schaefer
BY
ATTORNEYS.

United States Patent Office 2,958,913
Patented Nov. 8, 1960

2,958,913

PRODUCTION OF LARGE MASSES OF STEEL SUITABLE FOR THE PRODUCTION OF FORGINGS, AND APPARATUS THEREFOR

Adolph O. Schaefer, Montgomery County, Pa.
(Box 417, R.D. 4, Norristown, Pa.)

Filed Jan. 20, 1959, Ser. No. 787,968

2 Claims. (Cl. 22—212)

The present invention relates to the manufacture of large masses of steel and large steel forgings for heavy equipment, such as rotors for steam turbines or electrical generators, as well as to apparatus for making such masses of metal and forgings.

The present application is a continuation-in-part of my copending application Serial No. 608,471, filed September 7, 1956, now abandoned, for Production of Large Ingots and Forgings, and Apparatus Therefor.

A purpose of the invention is the manufacture of large masses of metal of an extremely high degree of homogeneity heretofore unachievable, thereby avoiding the initiation and preventing the propagation of cracks of any sort, particularly internal, and including flakes.

A further purpose is to improve the microstructure of large steel forgings and of the ingots or large masses of metal used in making large steel forgings.

A further purpose is to minimize the segregation of metallic and nonmetallic elements and compounds in large masses of steel and in large steel forgings made therefrom.

A further purpose is to eliminate the complex dentritic structure characteristic of large steel ingots produced by any means tried or suggested to date.

A further purpose is to eliminate pipe and shrinkage cavities commonly found in large steel forgings made from ingots cast by conventional methods.

A further purpose is to avoid the necessity of producing large steel ingots for the production of large steel forgings by pouring the heats of two or more melting furnaces, such as open hearth or electric arc furnaces, into the same ingot mold.

A further purpose is to increase the yield in producing large steel forgings from the mass of metal cast for such forgings.

A further purpose is to reduce the amount of forging necessary to produce a sound large steel forging of high quality by controlling the integrity of the steel and its microstructure in a manner not possible in conventional casting.

A further purpose is to provide a fine grained large mass of steel free from segregation and free from gas cavities.

A further purpose is to minimize the effect of gases present in conventional large steel ingots.

A further purpose is to deposit continuous individual molten increments on the top of the work, the molten increment at any one time not exceeding 15 pounds and preferably not exceeding 5 pounds of steel, to maintain the body of the work below such increments at temperatrues between 500 and 1250 degrees F., and preferably at temperatures between 1100 and 1250 degrees F., and to solidify and selfquench the increment on account of its small size and the lower temperature of the body of the work so as to achieve very fine grain and freedom from segregation and from gas cavities, the geometry of the work being such that a wide top surface is provided, a substantial part of which will at all times be solid in spite of the presence of a small molten increment, and the mass of the work due to the geometry being so close to the upper surface of the work that very effective extraction of heat from the increment occurs to obtain solidification and selfquenching. Satisfactory gometry is assured by providing in the finished mass a ratio of length to diameter which is between 1 to 1 and 4 to 1.

A further purpose is to relatively scan the top surface of the work by the electrodes so that the successive paths of the electrodes will be different, desirably by rotating the work on a vertical axis and moving the electrodes radially inwardly and outwardly.

A further purpose is to provide a thin metallic shell on the stool to confine the work, desirably adding plates to the shell as the work increases in length. This shell is not essential for the purpose of the invention, but may be a convenience in many cases.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1:
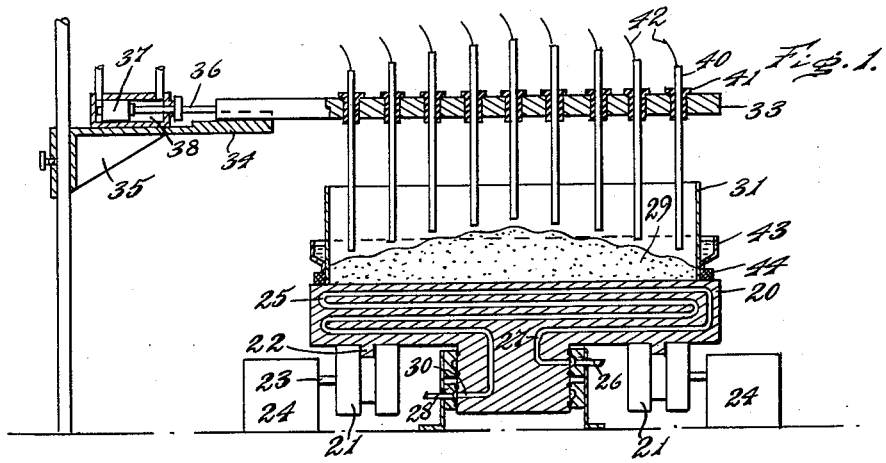
Figure 1 is a diagrammatic central vertical section of apparatus useful in carrying out the process of the invention, shown at an early stage in the production of the mass of metal.

Describing in illustration but not in limitation and referring to the drawings:

Recent alarming brittle failures of large steel forgings have led to an emergency program to reexamine the causes of the difficulties, and to produce higher quality large steel forgings by improvement in conventional methods. 78 Transactions of the ASME (October 1956) contains five papers on investigations of failures of turbine wheels, generator rotors, and the like, and ASTM Special Technical Publication No. 231, Symposium on Brittle Failure of Rotor Forgings (November 11, 1957) contains a series of articles on brittle failure of forgings and includes an article by the present inventor on "The Work of the Task Group on Brittle Failure with Respect to Research."

In the prior art it is common practice to produce large steel ingots for forging into large steel rotors and the like by pouring the products of two or more open hearth or electric furnaces into a cast iron ingot mold. In usual practice a refractory hot top is placed on the mold. The hot top is intended to feed the shrinkage cavities formed in the ingot as it solidifies and cools.

The castings thus obtained are imperfect and represent a considerable economic loss because of the presence of shrinkage cavities. Various techniques have been adopted to overcome these difficulties in large steel ingots. When reference is made herein to large steel ingots or masses, it is intended to refer to ingots or masses larger than 50 tons and usually larger than 100 tons, in the range from say 100 to 400 tons. The present invention will be most useful in this size range.

Among the proposals now in use for avoiding shrinkage cavities is the addition of exotehrmic compounds to the steel in the hot top. An electric arc has also been introduced in the hot top to keep the metal molten at the top of the mold for a longer period of time. Efforts have also been made to hot work the ingot at the top so that the entire metal of the ingot becomes sound. None of these procedures, however, has been fully satisfactory in large steel ingots.

The methods which tend to avoid shrinkage cavities are not beneficial in minimizing segregation during the solidification of the steel. In large steel ingots made by conventional methods or by any of the methods described in the literature or in patents, it is never possible to obtain homogeneous steel. The metal which solidifies differs in composition both vertically and radially.

Molten steel is a solution in iron of numerous elements, including carbon, manganese, phosphorus, sulphur, silicon, and gases such as nitrogen, oxygen, hydrogen, carbon monoxide, etc. In addition there are various amounts of alloying elements present in alloy steels, usually including one or more of the elements nickel, chromium, molybdenum, vanadium, etc. There are various insoluble materials such as sulphides, silicates, oxides, etc. resulting from the slag coating of the molten steel or from destruction of refractory linings.

In the conventional practice the solidification of a large steel ingot requires considerable time. During the hours of solidification, the complex solution above mentioned behaves in accordance with the principles of physics. Nucleation of crystals occurs first at the walls of the ingot mold. Later, after the temperature has dropped, nucleation takes place in the supercooled liquid metal remaining at the central portion of the mold. The purest metal solidifies first, rejecting impurities into the solution, and the least pure metal solidifies last. Unrestrained coarse crystal formations known as dendrites are produced, and segregation occurs in the dendrites and also in the grain boundaries.

Secondary segregation also occurs, in that impurity composition changes from surface to center and from bottom to top of the ingot.

One of the most serious segregation difficulties is through segregation of carbon in large steel forgings. Since segregation is particularly prevalent in large steel ingots for large forgings, and since tempered martensite cannot be obtained in the resulting large steel forgings, such forgings are extremely vulnerable to defects which may cause service failure.

Another difference between a large steel forging and a small steel forging is that in a small steel forging diffusion in the soaking pit corrects to a limited extent some of the difficulty from segregation. In a large steel forging however there is reason to believe that segregation difficulties can never be overcome within any practical soaking time.

All of these difficulties taken together, particularly the aggravated condition of segregation which occurs in large steel ingots, the inability to correct this entirely by soaking, the coarse dendritic crystal structure formed, and the inability to break up the ingot structure completely in large steel forgings have resulted in producing in large steel forgings a structure which because of its nonhomogeneity never can develop, in service, the ductility and toughness which it should have. Such defects as "flaking," which has caused such alarm in the failures of turbine and generator rotors occur more readily because of gases, segregation and coarseness of structure. In general, the present invention is concerned with the production of large steel forgings which are completely free from such lack of toughness, which are not susceptible to flaking, and which do not have in the forging and never had in the mass of metal from which they are made the coarse dendritic microstructure or the segregation characteristic of conventional large steel ingots.

Since the molten increment of steel at any time is limited to a size of 15 pounds, it undergoes rapid solidification with continuous adjustment of the accompanying shrinkage, and separate self quenching by rapid heat transfer to the already solidified portion of the mass of metal, thus assuring uniform fine grain throughout. Gas is able to discharge from the increment as it solidifies and cools. Segregation cannot extend beyond the increment because only that small amount of molten metal is available to segregate, and even in that small increment segregation is accordingly limited by the rapid solidification and quenching.

The geometry is regulated so that usually less than all of the top of the ingot may be molten at any one time; and in such case, it would not be possible for segregation to occur across the entire top surface of the mass. Furthermore, the cooling effect of the already solidified metal is always available to the molten increment of molten steel because the length of the ingot is not extended beyond a ratio of length to diameter of 4 to 1. On the other hand, the length is extended to at least a ratio of length to diameter of 1 to 1. There is thus a relatively short distance of heat transfer from the molten increment to the mass of the metal which provides a cooling reservoir.

Accordingly the structure of the mass of metal is completely different from the structure normally found in a large steel ingot. The microstructure is fine grained, and lacks dendrites. Chemical analyses are uniform throughout within the chemical tolerance of the metal itself. Shrinkage and gas cavities are lacking, because the increment undergoes shrinkage continuously and eliminates gas separately.

In accordance with the invention, I use a plurality of electric arcs to melt small consumable steel electrodes which have a composition substantially that of the final large mass of metal. The progressive increment of molten steel is deposited first into a stool or base and the deposit is built up by progressive solidification of a small increment. This will probably be a continuous operation in most cases, but a feature of this invention is that it may be discontinued and resumed subsequently after a lapse of time. As a result, a large mass of metal, larger than 50 tons and suitably of the order of 100 to 400 tons or more, is built up.

As a consequence, the forging produced from the mass of metal is of much higher quality, since reliance is not placed upon the forging operation to form fine grains, or to close shrinkage cavities or gas cavities but merely to better orient the grains and change the shape. For some types of service the mass of metal produced may be adequate without forging.

The science of electric arc melting has developed to such an extent that metal can readily be deposited which is characterized by cleanliness, soundness and a high degree of control of grain size, so that fine grain deposits can be obtained free from dendritic structure of the character previously encountered in large ingots. While large consumable arc melted deposits have been made in the past, no one has previously produced anything comparable to a large ingot in this manner; nor prior to this invention, has a means been devised to make large masses of metal of controlled structure and free from nonhomogeneity resulting from segregation.

In the past consumable electrodes or hollow electrodes through which metal to be melted is fed, have been melted in order to make highly alloyed small ingots for jet engine parts and the like. Nothing, however, has been accomplished to solve the problem of large ingots. It has been necessary, following the prior art, to deposit the metal in expensive water cooled copper molds, and the dendritic structure of the cast metal has been exaggerated rather than suppressed.

The present invention offers the following distinctive features:

(1) The electric arc is applied for melting electrodes having substantially the same chemical analysis as the final large mass of metal. Accordingly, masses or blocks ranging in diameter from 40 inches to 130 inches or larger can be made in accordance with the present invention.

(2) A plurality of consumable electrodes of small size is used, so that separate deposits of metal will be made by each electrode, and the upper portion of the ingot will never all be molten at the same time. The fact that the portion molten at a given time is limited to a small area of course reduces segregation and protects against forming shrinkage cavities.

(3) The electrodes are small, having a diameter not exceeding two inches and preferably not exceeding one inch. Electrodes small as one-fourth of an inch in diameter will be used in many cases. The increment of molten metal present at any one time under each electrode is very small, not exceeding 15 pounds in weight and preferably not exceeding 5 pounds in weight. This is important in preventing segregation and in avoiding shrinkage cavities, but particularly in connection with production of a fine grained ingot as deposited, as later explained. Metal is constantly being deposited from these small molten increments on the top of the solidified work or ingot, and more metal is added to each small increment by melting down the electrode.

(4) The mass or body of the metal which has previously been deposited is maintained at a temperature which is considerably below that of the molten increment of steel, suitably in the range between 500 and 1250 degrees F., and preferably in the range between 1100 and 1250 degrees F. The mass of metal is of huge size, in excess of 50 tons and probably in the range between 100 and 400 tons. Even when the mass or block is partially completed there is a relatively immense cooling capacity in this mass of metal at a temperature of 500 to 1250 degrees F. Furthermore, the distance between any increment of molten steel and the mass or body of the ingot is small, since the ingot ratio of length to diameter even when completed is between 1 to 1 and 4 to 1. There is no problem therefore of narrowness of cross section or remoteness of the mass, which could interfere with the effectiveness of the cooling of the increment of steel. Accordingly, the solidified metal cools very rapidly, and this favors absence of segregation and also absence of dendritic structure typical of large ingots. Furthermore, upon solidifying, the steel is selfquenching by the mass of steel already solidified, and this favors the production of a fine grain size. Accordingly these defects characteristic of large ingots in the prior art are avoided. The result is improved homogeneity and improved microstructure.

The invention is preferably applied in a mechanism which will cause relative scanning between the electrodes and the mass of metal. This is conveniently accomplished by mounting the work on a stool which rotates on a vertical axis, and turning the stool while moving the electrodes radially.

Any suitable electrical connections may be used for A.C. or D.C. as desired. It is believed that three-phase alternating current, delta or star connected, may be desirable.

The electrodes may suitably be cast in permanent cylindrical molds or they may be produced by rolling or drawing.

The lateral confines of the mass of metal are preferably determined by a thin metallic shell, suitably of light gauge steel sheet or plate, which can desirably be lengthened as required by adding additional sheets or plates. No confinement may be necessary in many cases.

Figure 2:
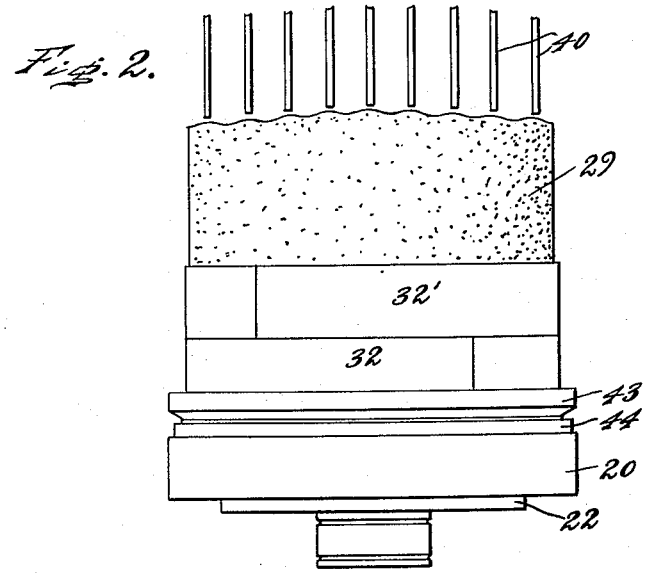
Figure 2 is a view corresponding to Figure 1 showing the operation at a later stage in the formation of the mass of metal.

I illustrate in Figures 1 and 2 a stool 20, suitably a turntable turning on rollers mounted in a circle, which are grooved to engage a circular track 22, the rollers being keyed on shafts 23 which are suitably driven as by motor and speed reducer combinations 24. If it is not desired to rotate the stool, it can be stationary if required. The stool is desirably of an alloy of high heat conductivity such as copper, and desirably has water cooling passages 25 which connect by an inlet stuffing box 26 with an inlet passage 27 and by an outlet stuffing box 28 with an outlet passage 30, each stuffing box being suitably connected to water piping. The stool has mounted thereon as by welding a cylindrical shell 31 of suitable material such as light gauge steel plate, suitably of the order of ⅛ to ¼ inch in thickness. The shell 31 is preferably made initially short from plates 32, and as the formation of the ingot progresses more plates 32' are added and connected by welding, lengthening the shell. As the length of the mass or block increases, the shell can suitably be omitted as shown in Figure 2 if desired, and in fact the shell can be wholly omitted if desired.

A support 33, desirably a bracket, extends out above the mass of metal 29, and is slidably mounted on a guide 34 on bracket 35. An arm 36 mounts a double acting piston 37 in a fluid cylinder 38 which receives fluid intermittently at the opposite ends and moves the support 33 radially of the ingot so that individual electrodes 40 mounted by insulation 41 on the support 33 can scan the top of the ingot in transverse paths which are successively different on successive rotations of the ingot about its vertical axis. Electrical connections to the electrodes are provided at 42 and the electrodes are advanced to maintain the arcs either manually or by suitable automatic adjusting mechanism as well known in the art.

In starting the formation of a mass of metal, a light steel plate may suitably be laid on the stool and the first welding increments deposited on the plate.

As the mass lengthens, the cooling effect from the stool may not be adequate and a trough 43 kept filled with water is placed around the outside of the shell 32 or the mass proper and moved upwardly as the work progresses to keep the temperature of the ingot in the range between 500 and 1250 degrees F. and preferably between 1100 and 1250 degrees F. Such cooling, as may be necessary, may also be provided by a spray. An electric resistance heater 44 is also provided surrounding the mass of metal and, if the cooling is excessive or if deposition is interrupted, the temperature can be controlled by turning on the electric resistance heater. This may be accomplished by induction or by gas heating. The rotation of the ingot is of course very slow, suitably of the order of 4 r.p.m. The combination of rotation of the ingot and radial motion of the electrode will tend to vary the electrode positions and deposit the increment of molten steel, successively varying the spiral paths.

Figure 3:
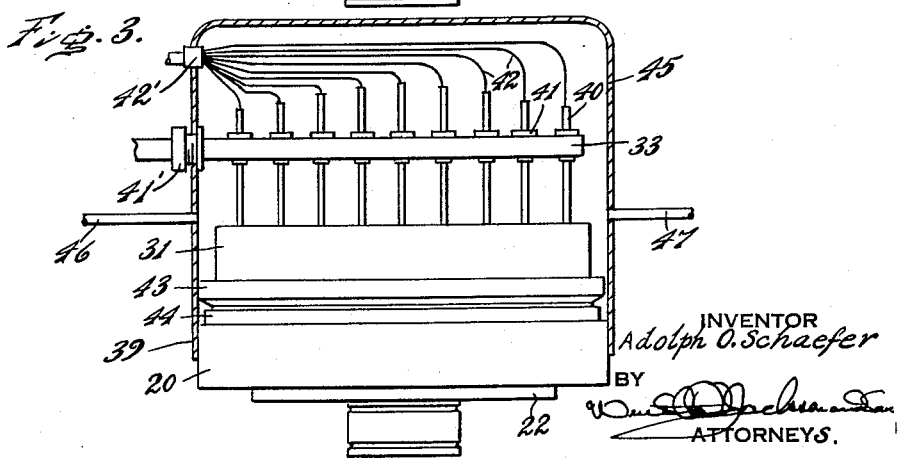
Figure 3 is a view similar to Figure 1 showing a modification which is arranged for vacuum or gas atmosphere operation.

In some cases it will be desirable to employ a vacuum, or an inert gas such as helium or neon at atmospheric or subatmospheric or superatmospheric pressure around the arcs, instead of air. Such desirability is not peculiar to my technique of slow deposition, but is common in the art of steel melting as an aid in the control of gas content of metal. It is mentioned here solely to make clear that the proposed method can be adapted to this if it is necessary. For this purpose I illustrate in Figure 3 a device similar to that of Figure 1, except that a gas-tight cover is provided at 45 with a gas-tight insulated stuffing box at 41' through which the support 33 enters, a gas-tight insulated seal 42' for the insulated wiring and a gas-tight rotating seal 39 of any suitable type against the steel. A pipe connection 46 is provided to introduce inert protecting gas and a pipe connection 47 is provided to remove inert protecting gas so that the gas can flow through the arc space above the mass of metal. If desired the pipe 46 or both pipes can be connected to vacuum pumps.

Of course where subatmospheric pressure is to be used, the shell 31 and the cover should be strong enough to avoid crushing under the pressure of the atmosphere.

It will be evident that in the present invention the ingot mold is expendable, and it is no longer necessary to keep an inventory of cast ingot molds in the shop, nor is it necessary to have water cooled copper molds of any kind. Only in those cases of convenience, a containing shell may be fabricated in a size close to the exact size of the final desired mass of metal, both as to diameter and height, so that the amount of forging reduction can be ideal for the particular case, instead of requiring extra forging to size.

The containing shell, when used, will be welded to the ingot and will be eliminated by scaling when the ingot is heated for forging, or by machining for forging prior to use.

The arc temperature in the molten steel is of the order of 6000 degrees F. This has a tendency to expel most of the common gases present in steel, such as hydrogen, oxygen, nitrogen and carbon monoxide. Even where air is present around the arc space, the mass of metal is relatively free from gases as compared to conventional practice. Furthermore the slow deposition of small increments and the long periods during which they are held at approximately 1150 degrees F. will expel any gases which may be in solution. The use of vacuum or subatmospheric pressure may be needed to further reduce the gas content, or to protect the molten increment in some cases. By control of the rate of deposit of the consumable electrodes, the temperature of the mass, and the heating and cooling rate, and by control of the chemical analysis of the electrodes, I secure a large mass of metal which has many advantages over prior practice. In the first place it is homogeneous throughout and not segregated. The microstructure is free from dendrites and instead has fine grains throughout. The mass is also free from shrinkage cavities and free from gas cavities likely to be encountered in conventional large ingots. The quality of large steel blocks or masses according to the invention is therefore at least comparable with the quality of large steel forgings made from large steel ingots of the prior art, or even superior to such prior art large steel forgings.

One of the greatest advantages of the large steel masses of the invention is that they have no tendency to flaking which has existed in prior art at steel ingots and forgings.

The invention therefore makes it possible to produce rotors for turbines, electric generator rotors, and the like, with or without forging, which have the benefits of greatly improved microstructure, with freedom from the complex dendritic structure and presence of fine grains, absence of segregation, absence of gas and shrinkage cavities, and freedom from gases, and most important of all, structural homogeneity. It is no longer necessary to use melts from several different furnaces. Yields are increased and forging requirements are reduced. In the alternative, the mass can be used without forging to obtain an improved product.

It will of course be understood that such factors as particular electrode size, particular number of electrodes, power input, cooling rate of the jacket and the stool, heating if any, and relative rate of scanning by the arcs, will be controlled to meet the particular requirements.

It will also be evident that while cylindrical electrodes are conisdered to be preferable, other electrode shapes can be used if desired.

In view of my invention and disclosure, variations and modifications to meet individual whim or particular need will doubtless become evident to others skilled in the art, to obtain all or part of the benefits of my invention without copying the process and apparatus shown, and I, therefore, claim all such insofar as they fall within the reasonable spirit and scope of my claims.

Having thus described my invention, what I claim as new and desire to secure by Letters Patent is:

1. The process of producing large steel masses having a size in excess of 50 tons and having homogeneity heretofore unapproached and improved microstructure and freedom from gases suitable for making forgings and the like, which comprises electric arcing between the work and a plurality of separated consumable steel electrodes each of which has a diameter less than two inches and each of which has a composition corresponding to the work, depositing a succession of continuous increments of molten steel on top of the work at a rate so slow that the body of the work below the electrodes is maintained at a temperature between 500° and 1250° F., the increment of steel molten at each electrode being at all times less than 15 pounds, while maintaining the increments of molten metal from the respective electrodes separate and non-communicating in different localized areas of the top of the work so that each increment will be free from influence by the composition of the other increments, the increments of molten steel solidifying and self-quenching substantially momentarily on account of their small size and the lower temperature of the body of the work, eliminating gas because of the smallness of the increment and the high temperature at which the mass is held, changing the relative positions of the electrodes with respect to the work and thereby changing the locations of the separate increments deposited as the mass of the work increases, and building up the work to a size in excess of 50 tons and until the ratio of depth of metal to lateral dimension is between 1 to 1 and 4 to 1.

2. The process of producing large steel masses having a size in excess of 50 tons and having complete structural homogeneity and improved microstructure and freedom from gases suitable for making forgings and the like, which comprises building up on a stool a thin confining metallic shell, electric arcing between the work and within the shell from a plurality of separate steel electrodes each of a diameter less than two inches and of a composition corresponding to the work, depositing from each electrode a continuous small increment of molten steel on the top of the work, which increment is separate and maintained separate from the increments from the other electrodes so that the composition of one increment is free from influence by the composition of another increment, maintaining the body of the work below the electrodes at a temperature between 500° and 1250° F., the increment of steel molten at each electrode being at all times less than 15 pounds and being localized to its own limited area, so that it is out of communication while in molten form with the other increments, the increments of molten steel solidifying and self-quenching on account of the small rate of deposition and the lower temperature of the body of the work, progressively building up the thin confining shell higher as the work becomes higher, eliminating gas because of the smallness of the increment and the high temperature at which the mass is held, relatively moving the positions of the electrodes with respect to the position of the work as the mass of the work increases, and building up the work within the shell to a size in excess of 50 tons and until the ratio of depth of metal to lateral dimension is between 1 to 1 and 4 to 1.

References Cited in the file of this patent

UNITED STATES PATENTS

| | | |
|---|---|---|
| 2,055,980 | Liebmann | Sept. 29, 1931 |
| 2,107,943 | Hopkins | Feb. 8, 1938 |
| 2,385,206 | Hopkins | Sept. 18, 1945 |
| 2,445,670 | Hopkins | July 20, 1948 |
| 2,541,764 | Herres et al. | Feb. 13, 1951 |
| 2,686,822 | Evan et al. | Aug. 17, 1954 |
| 2,705,353 | Ziegler | Apr. 5, 1955 |
| 2,727,936 | Boyer | Dec. 20, 1955 |
| 2,800,519 | Garmy | July 23, 1957 |

FOREIGN PATENTS

| | | |
|---|---|---|
| 317,961 | Sweden | June 1, 1953 |